April 27, 1965  R. W. JOHNSON ETAL  3,180,250
HAY PELLETIZING APPARATUS
Original Filed July 9, 1962

INVENTOR.
Roy W. Johnson
Donald R. Vaughan
BY Townsend and Townsend
attorneys

3,180,250
HAY PELLETIZING APPARATUS
Roy W. Johnson, Davis, and Donald R. Vaughan, Woodland, Calif., assignors, by mesne assignments, to Deere & Company, Moline, Ill., a corporation of Delaware
Continuation of application Ser. No. 208,507, July 9, 1962. This application Aug. 3, 1962, Ser. No. 214,704
9 Claims. (Cl. 100—98)

This invention relates to apparatus for compressing loose hay into compact pellets; and this application is a continuation of application Serial No. 208,507 filed July 9, 1962 (now abandoned) and is an improvement over our co-pending patent applications Serial No. 801,253 filed March 23, 1959 (now Patent No. 3,090,182), and Serial No. 143,718 filed October 9, 1961.

Disclosed in the patent application cited above is apparatus for gathering hay and compressing the hay into compact pellets for feeding to livestock. The apparatus so described generally includes a die with a set of elongate cavities therein, a ram reciprocally movable toward the die, and a screw conveyor or the like for feeding hay to a situs between the ram and the die. Movement of the ram up to the die forms pellets in the cavities. Various mechanisms are disclosed in our previously filed applications for handling the hay before its deposit into the screw conveyor and for handling the pellets after their formation; we wish to expressly incorporate by reference the disclosure of such mechanisms into the present application. Such mechanisms include a device for picking up the hay from the ground, a moving endless belt having fingers protruding from its surface for transporting the hay up from the pickup device, a magnetized drum for removing unwanted scrap iron from the hay, an attachment for recycling hay fines through the pellet forming dies, and an improved auger conveyor for feeding hay to the dies.

The subject matter of the aforecited patent applications concern pelletizing apparatus in which a screw conveyor is provided for each ram-die combination. In an effort to construct a lighter and less expensive pelletizer of the same capacity, an arrangement by which one screw conveyor, a heavy and expensive part of the machine, fed two or more pellet forming dies was desired. Accomplishment of the foregoing desideratum led to the present invention.

The present invention generally includes in combination a plurality of dies, each one of which includes a set of elongate cavities, a plurality of reciprocally driven rams, one such ram being associated with each die, and a single screw conveyor for feeding hay to a situs in front of the rams. The rams have a novel shape in accordance with the invention that assures a smooth and continuous flow of hay into the dies, and also assures efficient and consistent compaction of hay into the cavities by the several rams. Efforts to consolidate two or more sets of die cavities and their associated rams under one screw conveyor were at first unsuccessful because partitions were required to define a guideway for each set of die cavities and such partitions formed obstructions against which a residual charge of compressed hay accumulated. Such residual charge of hay become hardened and adversely affected operation of the device by increasing wear to such an extent that the operating life of the pelletizer was materially shortened.

It is therefore an object of the present invention to provide lightweight hay pelletizing apparatus wherein one screw conveyor can feed a plurality of ram-die assemblies. This object is realized by providing a hay receiving chamber that has a smooth, projection-free interior surface and a plurality of rams that almost entirely fill the chamber. The head of each ram is formed with a slanted side portion for transversely sweeping the residual charge of hay that is not compressed into a set of die cavities by the ram on its forward stroke to the input end of an adjacent set of die cavities. Such residual charge of hay will then be compressed in the last mentioned die cavity set when the ram associated therewith moves toward the die cavity set. Thus the hay is continuously moved through the screw conveyor, the chamber at the output end of the screw conveyor, and the pellet forming die cavities without harmful accumulation of a residual charge of hay.

These and other objects, features, and advantages will be apparent after referring to the following specification and attached drawings in which.

Figure 1:
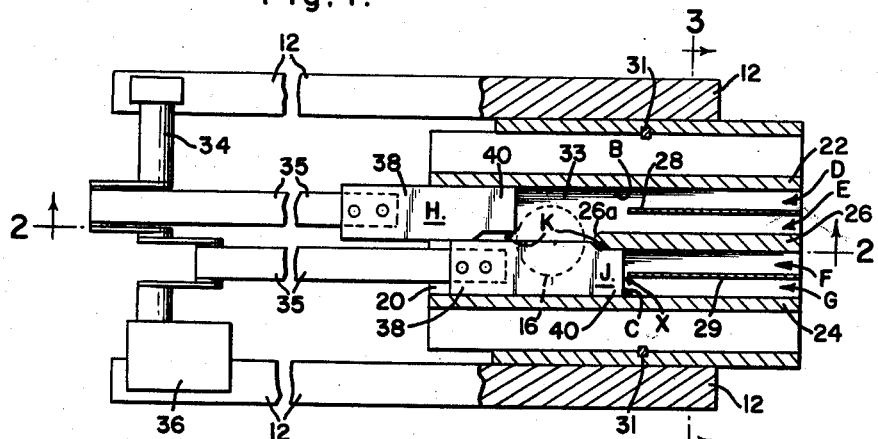
FIG. 1 is a plan view of a dual ram die cavity combination of a hay pelletizer taken substantailly along line 1—1 of FIG. 2.

A suitable conveyor A conveys hay downwardly to a situs in front of mutually parallel ram and hay guideways B and C. Guideway B communicates with a set of elongate die cavities D and E; guideway C communicates with a set of elongate die cavities F and G. Although in the embodiment shown each set of cavities consists of two elongate die cavities, a greater number in each set can be provided within the scope of the present invention. Reciprocating rams H, J are arranged to compress hay through guideways B and C, respectively, into the die cavities where compacted hay pellets are formed. Each ram H, J is formed with a reduced width at one end to permit the ram to enter guideways B and C. Mutually facing sides of rams H, J are formed with a sweep portion K that is adapted to sweep transversely the residual charge of hay that is not pressed into one guideway, so that such hay is pressed into the other guideway on the next ram stroke.

Frame members 12 are employed for supporting the elements of the pelletizer. For convenience of description the right hand side of FIGS. 1 and 2 wil be denominated the forward end of the apparatus; the left hand side, the rear end of the apparatus. Conveyor A is formed with a tapered auger 13 disposed for rotation in a housing 14. A suitable driving means not shown causes rotation of auger 13 so that hay delivered to the top of housing 14 is conveyed downwardly. Conveyor A has an output end 16 that opens into a situs between the guideways and the rams.

A ram guide housing is formed by a bottom wall 20 and side walls 22, 24. Guideways B and C are defined at the forward end of the die housing by a partition 26, having a rounded rear edge 26a, and a top wall 27 which extends from the front of the housing to edge 26a of the partition. A divider blade 28 between sidewall 22 and partition 26 forms a common wall between die cavities D and E; a divider blade 29 between sidewall 24 and partition 26 forms a common wall between die cavities F and G. The rearward edges of dividers 28, 29 lie forward of the guideways to form a head space $x$ between the rams and the divider blades. Head space $x$ permits entry of rams H and J into the guideways without contacting the forward edge of the divider blades. The vertical housing and cavity forming members are locked against longitudinal movement by keys 30; the horizontal members, by keys 31.

Rearwardly of guideways B and C at edge 26a, a chamber 33 for receiving hay from conveyor A is formed in the ram guide housing by the rearward parts of bottom wall 20 and side walls 22, 24. Rams H and J are adapted for reciprocal movement through chamber 33 in the ram guide housing and are driven by a conventional crankshaft 34 through rod 35 and any suitable linkage (not shown) for converting the up and down motion to straight line motion along a line parallel with the longitudinal axis of the guideways and die cavities. Shaft 34 is powered by a suitable prime mover shown schematically at 36.

Rams H and J are formed with body portions 38 and head portions 40. Body portions 38 are wide enough to substantially fill hay receiving chamber 33 between sidewalls 22 and 24. Head portions 40 are formed to enter guideways B and C by an amount insufficient to permit contact between the rams and divider blades 28, 29. Stated otherwise, a head space $x$ is maintained between the rams and die cavities D, E, F, G at all times, even when the rams are in their forwardmost position. The inner forward corner of each ram is cut out to form the sweep portion K on each ram. Sweep portion K in the present embodiment is formed as a straight surface at a 45° angle with the side of body portion 38; such shape is exemplary. Sweep portion K can also be an arcuate shape or any similar smooth configuration that sweeps hay transversely of the direction of ram reciprocation.

Figure 2:
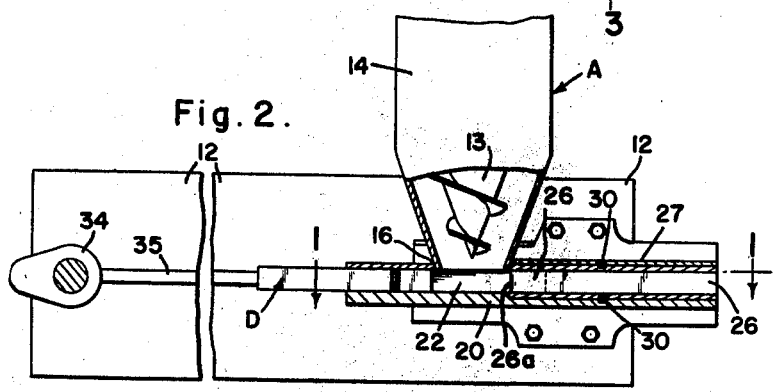
FIG. 2 is a sectional side view taken along line 2—2 of FIG. 1.
Figure 3:
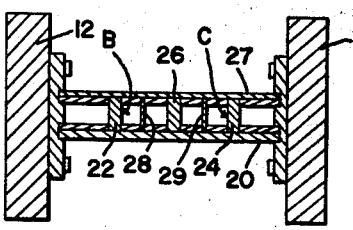
FIG. 3 is a cross sectional view taken along line 3—3 of FIG. 1.

In operation hay is delivered to the upper end of housing 14 of conveyor A and is deposited into hay receiving chamber 33 by the action of auger 13. When the rams are positioned as shown in FIG. 1, such hay is deposited between head portions 40 of ram H and guideway B. As additional rotation of shaft 34 causes ram H to move toward guideway B, the hay in front of the ram will be compressed through guideway B to die cavities D and E. Two pellets will be formed, one in die cavity D and one in die cavity E. Simultaneously with the formation of such pellets, ram J is moving away from the input end of guideway C. As head end 40 of ram H enters the input end of guideway B, the residual charge of hay between sweep portion K and end 26a of partition 26 will be swept transversely into or in front of the input end of guideway C. Movement of ram J toward guideway C causes such residual charge of hay to be compressed through guideway C into die cavities F and G with the hay from conveyor A on the next forward stroke of ram J. Completion of the forward stroke of ram J sweeps a residual charge of hay from between end 26a of partition 26 and sweep portion K of ram J transversely to guideway B and the above described procedure is repeated.

Thus we have provided apparatus for pelletizing hay that is much lighter in weight than the previous equipment and permits rapid and continuous movement of hay therethrough. Fitting of rams H and J into hay receiving chamber 33 and formation of sweep surface K in accordance with our invention eliminates the accumulation of a residual charge of hay in the hay receiving chamber.

While one embodiment of our invention has been shown it will be apparent that other adaptations and modifications may be provided without departing from the spirit and scope of the present invention.

In the claims:

1. In a hay pelletizer the improvement comprising means defining a first set of elongate die cavities, means defining a second set of elongate die cavities in parallel spaced relation to said first set of die cavities, said second cavity set defining means having a common wall with said first cavity set defining means thereby forming a partition between said cavity sets, first and second guideways communicating with respective said first and second sets of die cavities, first and second rams alternately reciprocally moveable into and away from said guideways for compressing hay through said guideways into said die cavities, each said ram having a body portion with a side surface disposed in mutual facing relationship with one another, a head portion sized for entry into said guideway, and a sweep portion intermediate said body portion and said head portion on mutually facing sides of said rams, said rams being disposed so that mutually facing side surfaces of the body portions slidably contact one another when reciprocated, the mutually facing side surfaces of the head portions being spaced from one another, means for conveying hay to a situs between said guideways and said head portions of said rams, and means for alternately reciprocally driving said rams into and away from said guideways.

2. Apparatus for pelletizing hay comprising top, bottom and side walls forming a die housing, a partition in said housing for dividing said housing into first and second juxtaposed guideways, blades defining first and second sets of die cavities in communication with said guideways on opposite sides of said partition, first and second rams each having a head end and being alternately reciprocally movable toward and away from said guideways for compressing hay through said guideways into said die cavities, said first and second rams each being formed with an inwardly facing bearing surface and being disposed so that the bearing surfaces slidably contact one another, each said ram also having a portion excised from the bearing surface at the head end to size each ram head end for entry into respective guideways, said excised portions being formed for clearing said partition and for transversely sweeping to an opposite guideway hay that is compressed between the excised portion of a ram and said partition when last said ram moves toward said guideway, means for conveying hay to a situs between the head end of said rams and said guideways, and means for alternately reciprocally driving said rams.

3. Apparatus for pelletizing hay comprising means defining first and second sets of elongate die cavities disposed in parallel side-by-side relation, each set of die cavities having a guideway at one longitudinal end thereof, first and second rams adapted for alternate reciprocal longitudinal movement toward and away from respective sets of die cavities to compress hay into said cavities, each said ram having a head portion for entry into the guideway of the respective die cavity set and a body portion relatively wider than said head portion formed with a surface for slidably bearing against a similar surface of the other ram, means for conveying hay to a situs between the input opening of said guideways and the head portion of said rams, and means for alternately reciprocally driving said rams.

4. Apparatus for pelletizing hay comprising means forming a ram guide housing, said housing having a generally rectangular shape in planes normal to the direction of elongation, a partition in said housing adapted to divide said chamber at one end thereof into two substantially identical side-by-side rectangular guideways, means defining pellet forming die cavities communicating with said guideways, a pair of rams adapted for alternate reciprocal movement into and out of said guideways to compress hay through said guideways into said die cavities, each said ram having a head portion adapted for entry into respective guideways and a relatively wide portion formed inwardly thereon with a surface for mutual sliding contact with one another, each said ram having intermediate said head and wide portions an inwardly facing sweep surface sloping back from a point adjacent the head portion to the wide portion for sweeping hay transversely of said partition, means for alternately reciprocally driving said rams, and means for conveying hay to a situs between the guideway and the rams when the rams are out of said die cavities.

5. Apparatus for pelletizing hay comprising a hay conveying means, said conveying means having an output end, a receptacle in hay receiving relation to said output end, means defining first and second juxtaposed guideways communicating with said receptacle, last said means including a partition common to said guideways, means defining pellet forming cavities in communication with each said guideway, first and second rams for alternate reciprocating movement through said receptacle into and out of said guideways, said rams each having a head portion adapted to compress hay into said guideways and a widened body portion so dimensioned in a direction transverse to the direction of ram reciprocating movement that the widened body portions of the rams slidably contact one another and the interior of the receptacle in response to reciprocating movement of said rams, said rams being formed with a portion of the surface of each ram that faces the other ram converging smoothly from the head portion to the body portion for transversely sweeping a residual charge of hay that is compressed between a ram and said partition upon the movement of the last mentioned ram into the respective guideway so that the residual charge of hay is moved into the other guideway upon the succeeding movement of other ram into said other guideway, and means for alternately reciprocally driving said rams.

6. Apparatus for pelletizing hay comprising an elongate hay receiving chamber formed with a flat bottom wall and two side walls affixed longitudinally of the bottom wall in parallel relationship with one another; means for conveying hay to said chamber; a pair of rectangular guideways disposed at one longitudinal end of said chamber, die cavities in communication with said guideways, said guideways and die cavities being formed by extensions of said flat bottom and said side walls, a top plate, and a partition parallel with and spaced equidistantly between said side wall extensions; a pair of rams; and means for driving said rams alternately reciprocally through said hay receiving chamber and into and out of said guideways for moving hay from said chamber into said cavities through said guideways, each said ram being formed with a body portion having a width equal to about one half the width of said chamber and a thickness equal to the height of said side walls, each said ram also having a head portion narrower than said body portion for entry into said guideway and for clearance of said partition and a slanted side forming a sweep portion between the head portion and the body portion for transversely sweeping a residue of hay that has been compressed between the partition and a ram upon the movement of the last mentioned ram into the guideway associated with said last mentioned ram, thereby positioning the residue of hay in front of the other guideway to permit the residue to be pushed into the other guideway.

7. In a hay pelletizer of the type wherein hay is deposited in front of dies to be compressed into said dies by compression strokes of longitudinally reciprocating rams, the improvement comprising means forming a pair of juxtaposed elongate parallel sets of die cavities, said die cavities forming means including a common partition between said sets of die cavities, a ram associated with each of said sets of die cavities, and means for driving each said ram alternately reciprocally toward and away from said cavities to compress hay into its associated set of die cavities, each said ram having means forming a slanted side surface portion for transversely sweeping to the other set of die cavities hay that has been compressed against said partition by the other ram upon its compression stroke.

8. In a hay pelletizer of the type wherein hay is compressed into dies by longitudinally reciprocating rams, the improvement comprising means forming a pair of juxtaposed sets of elongated parallel die cavities, each said set of die cavities having means defining a guideway at an input end thereof, said guideway defining means including a common partition between said guideways, a pair of rams, means for driving said rams alternately reciprocally toward and away from said guideways for compressing hay through respective guideways into said die cavities, a housing for slidably supporting said rams for reciprocal movement relative said guideways, said housing defining a hay receiving chamber between said rams and said guideways, and a single means for conveying hay to said hay receiving chamber, said rams being formed with smooth side surfaces for sliding contact with one another and the housing, said rams also being formed with cut out portions adjacent the forward end thereof to sweep hay that has been compressed between said cut out portions and said partition, said cut out portions sloping outwardly back from forward ends of said rams to sweep last said compressed hay transversely of the direction of reciprocal movement of the rams.

9. Apparatus for pelletizing hay comprising means defining first and second sets of elongate die cavities disposed in parallel side-by-side relation, each said cavity set having an input opening at one longitudinal end thereof, a ram associated with each input opening, and means for reciprocally moving each ram alternately toward and away from its associated die set, each said ram being formed with a head end shaped to compress hay into its associated die, each said ram also having a body portion formed wider than said head, said body portion having a smooth side surface for bearing against a like surface on the other ram body portion and a smooth transition surface sloping outwardly back from a point adjacent said head end to said body portion for sweeping transversely a residue of hay that has been compressed between a ram and said means defining die cavities so that the residue of hay is positioned to be compressed by the other ram into the set of die cavities associated therewith on the next movement of the last mentioned ram toward the set of die cavities.

References Cited by the Examiner
UNITED STATES PATENTS

| 252,711 | 1/82 | Atkiss | 100—209 X |
|---|---|---|---|
| 692,605 | 2/52 | Bratton. | |
| 729,149 | 5/03 | Fenn | 100—98 X |
| 1,609,154 | 11/26 | Carteret | 100—295 X |
| 2,296,516 | 9/42 | Goss. | |
| 3,006,272 | 10/61 | Brady | 100—93 |

WALTER A. SCHEEL, *Primary Examiner.*

A. G. STONE, WALTER A. SCHEEL, *Examiners.*